United States Patent
Ma et al.

(10) Patent No.: US 7,599,441 B2
(45) Date of Patent: Oct. 6, 2009

(54) LOW COMPLEXITY SOFT-INPUT VITERBI DECODING FOR DIGITAL COMMUNICATION SYSTEMS

(75) Inventors: Jun Ma, Irvine, CA (US); Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 590 days.

(21) Appl. No.: 11/471,187

(22) Filed: Jun. 20, 2006

(65) Prior Publication Data

US 2007/0291864 A1     Dec. 20, 2007

(51) Int. Cl.
*H04L 5/12*         (2006.01)
*H04L 23/02*        (2006.01)
*H04L 27/06*        (2006.01)

(52) U.S. Cl. .................. 375/262; 375/261; 375/341

(58) Field of Classification Search ............... 375/262, 375/261, 341, 259, 260, 340, 316
See application file for complete search history.

(56) References Cited

U.S. PATENT DOCUMENTS

| | | | |
|---|---|---|---|
| 7,032,156 B2 | 4/2006 | Yu et al. | |
| 7,075,970 B2 * | 7/2006 | Maru | .............. 375/140 |
| 2004/0246888 A1 | 12/2004 | Peron | |
| 2006/0109926 A1 * | 5/2006 | Jalali et al. | .............. 375/260 |
| 2007/0171808 A1 * | 7/2007 | Wu et al. | .............. 370/208 |

FOREIGN PATENT DOCUMENTS

GB     2418118     3/2006

\* cited by examiner

*Primary Examiner*—Shuwang Liu
*Assistant Examiner*—Brian J Stevens
(74) *Attorney, Agent, or Firm*—Rahman LLC

(57) ABSTRACT

A DVB-H bit-interleave coded modulation/demodulation system and method includes a convolutional encoder; an interleaver operatively connected to the convolutional encoder; a quadrature amplitude modulation (QAM) mapper operatively connected to the interleaver; a channel component operatively connected to the QAM mapper; a QAM demapper operatively connected to the channel component; a de-interleaver operatively connected to the QAM demapper; and a Viterbi decoder operatively connected to the de-interleaver. Preferably, the interleaver comprises a bit-wise interleaver and a symbol-wise interleaver operatively connected to the bit-wise interleaver. Preferably, the de-interleaver comprises a bit-wise de-interleaver; and a symbol-wise de-interleaver operatively connected to the bit-wise de-interleaver. The de-interleaver may be adapted to decode a soft decision metric for any of a QPSK, 16QAM, and 64QAM modulation. The de-interleaver may be adapted to decode a soft decision metric computation comprising a log-likelihood ratio soft decision metric of a binary bit stream of a signal.

17 Claims, 6 Drawing Sheets

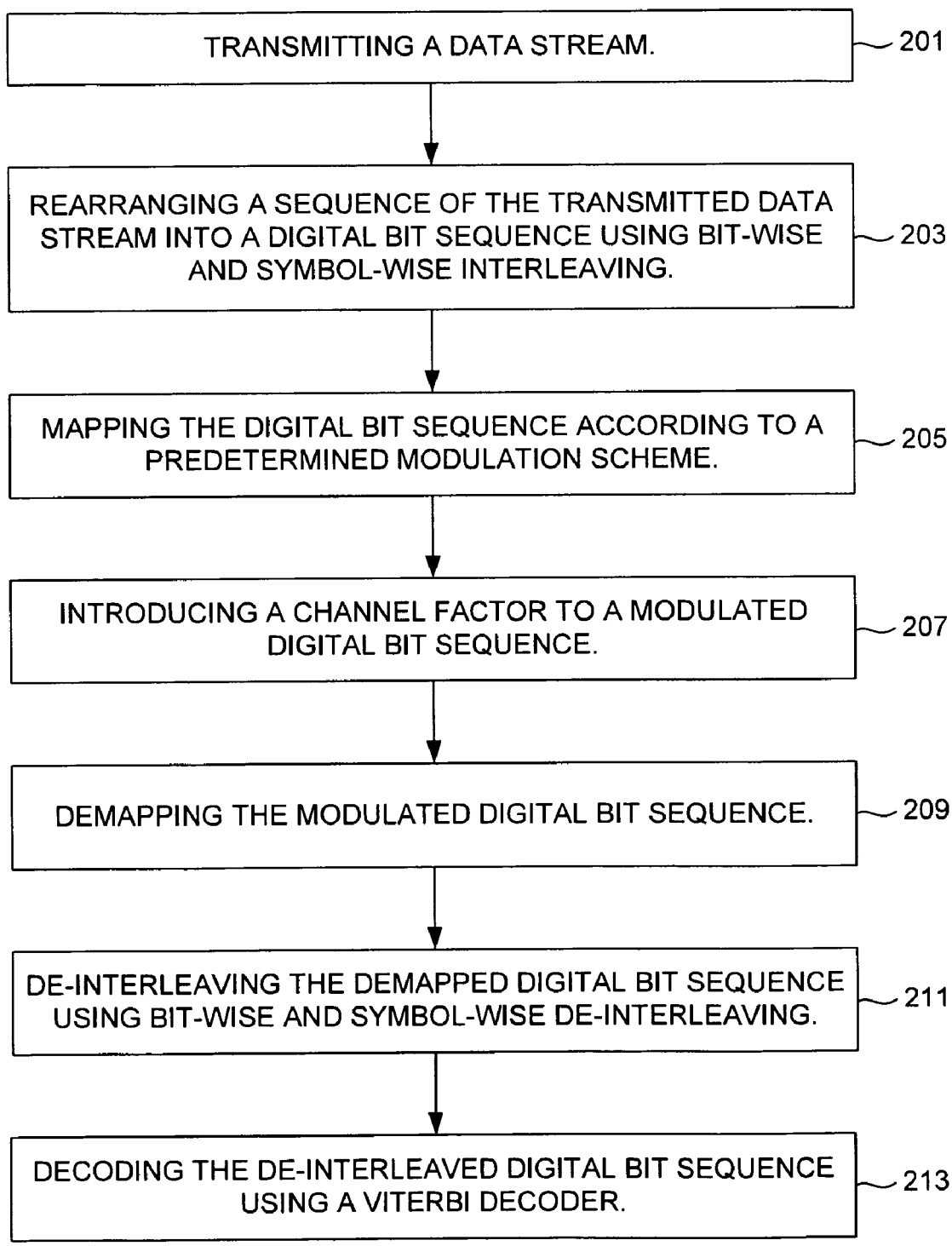

LOW COMPLEXITY SOFT-INPUT VITERBI DECODING FOR DIGITAL COMMUNICATION SYSTEMS

BACKGROUND

1. Technical Field

The embodiments herein generally relate to mobile television (TV) technologies, and, more particularly, to transmission schemes for mobile TV digital video broadcasting (DVB) applications.

2. Description of the Related Art

Handheld devices with integrated digital television access are a relatively new phenomenon. Such technology has traditionally been limited by size, power consumption, and most importantly performance. Poor performance of such devices has typically been the result of the constantly changing receiver environment. More particularly, the quality of the received signal is affected by the device's ability to manage adjacent-channel rejection, low signal-to-noise ratios (SNRs), and Doppler compensation, among other factors.

Digital Video Broadcasting-Handheld (DVB-H) is the specification for bringing broadcast services to handheld receivers, and was formally adopted as a European Telecommunications Standards Institute (ETSI) standard in November 2004. More specifically, DVB-H is a terrestrial digital TV standard that tends to consume less power than its predecessor, the DVB-T standard, and generally allows the receiver to move freely while receiving the signal transmission, thereby making it ideal for cellular phones and other mobile devices to receive digital TV broadcasting over the digiTV network, and hence without having to use cellular telephone networks.

One of the drawbacks of the conventional systems involves channel fading during viewing. Accordingly, there remains a need for a new technique capable of providing a better channel transmission for digital handheld TV systems.

SUMMARY

In view of the foregoing, an embodiment herein provides a DVB-H bit-interleave coded modulation/demodulation system comprising a convolutional encoder; an interleaver operatively connected to the convolutional encoder; a quadrature amplitude modulation (QAM) mapper operatively connected to the interleaver; a channel component operatively connected to the QAM mapper; a QAM demapper operatively connected to the channel component; a de-interleaver operatively connected to the QAM demapper; and a Viterbi decoder operatively connected to the de-interleaver. Preferably, the interleaver comprises a bit-wise interleaver and a symbol-wise interleaver operatively connected to the bit-wise interleaver. Preferably, the de-interleaver comprises a bit-wise de-interleaver; and a symbol-wise de-interleaver operatively connected to the bit-wise de-interleaver. Moreover, the de-interleaver may be adapted to decode a soft decision metric for any of a quadrature phase-shift (QPSK), 16QAM, and 64QAM modulation. Furthermore, the de-interleaver may be adapted to decode a soft decision metric computation comprising a log-likelihood ratio (LLR) soft decision metric of a binary bit stream of a signal. Preferably, the Viterbi decoder is adapted to decode a de-interleaved binary bit stream transmitted from the de-interleaver. Additionally, the LLR corresponding to the binary bit stream of a signal may equal $$\frac{1}{4}(m_0(c_l) - m_1(c_l)),$$

wherein $c_l$ represents transmitted code of the binary bit stream, wherein $m_0$ represents a minimum Euclidean distance from a received soft decision symbol to hard decision symbols in a subset of constellation points with an $i^{th}$ bit equal to zero, and wherein $m_1$ represents a minimum Euclidean distance from the received soft decision symbol to the hard decision symbols in the subset of constellation points with the $i^{th}$ bit equal to one. Also, the soft decision metric of a $k^{th}$ symbol of a received noisy QAM symbol, $y_k$, the LLR corresponding to an $i^{th}$ bit in a $k^{th}$ symbol of a received noisy QAM symbol, $y_k$, may equal $$\frac{1}{4}(m_0(y_{k,i}) - m_1(y_{k,i})),$$

wherein $m_0$ represents a minimum Euclidean distance from a received soft decision symbol to hard decision symbols in a subset of constellation points with an $i^{th}$ bit equal to zero, and wherein $m_1$ represents a minimum Euclidean distance from the received soft decision symbol to the hard decision symbols in the subset of constellation points with the $i^{th}$ bit equal to one.

Another aspect of the embodiments herein provides a DVB-H bit-interleave coded modulation/demodulation method and a program storage device readable by computer, tangibly embodying a program of instructions executable by the computer to perform the DVB-H bit-interleave coded modulation/demodulation method, wherein the method comprises transmitting a data stream; rearranging a sequence of the transmitted data stream into a digital bit sequence using bit-wise and symbol-wise interleaving; mapping the digital bit sequence according to a predetermined modulation scheme; introducing a channel factor to a modulated digital bit sequence; demapping the modulated digital bit sequence; de-interleaving the demapped digital bit sequence using bit-wise and symbol-wise de-interleaving; and decoding the de-interleaved digital bit sequence using a Viterbi decoder.

Preferably, the method further comprises decoding a soft decision metric for any of a QPSK, 16QAM, and 64QAM modulation. Moreover, the method may further comprise decoding a soft decision metric computation comprising a LLR soft decision metric of a binary bit stream of a signal. The LLR corresponding to the binary bit stream of a signal may equal $$\frac{1}{4}(m_0(c_l) - m_1(c_l)),$$

wherein $c_l$ represents transmitted code of the binary bit stream, wherein $m_0$ represents a minimum Euclidean distance from a received soft decision symbol to hard decision symbols in a subset of constellation points with an $i^{th}$ bit equal to zero, and wherein $m_1$ represents a minimum Euclidean distance from the received soft decision symbol to the hard decision symbols in the subset of constellation points with the $i^{th}$ bit equal to one. Additionally, the soft decision metric of a $k^{th}$ symbol of a received noisy QAM symbol, $y_k$, the LLR corresponding to an $i^{th}$ bit in a $k^{th}$ symbol of a received noisy QAM symbol, $y_k$, may equal $$\frac{1}{4}(m_0(y_{k,i}) - m_1(y_{k,i})),$$

wherein $m_0$ represents a minimum Euclidean distance from a received soft decision symbol to hard decision symbols in a subset of constellation points with an $i^{th}$ bit equal to zero, and wherein $m_1$ represents a minimum Euclidean distance from the received soft decision symbol to the hard decision symbols in the subset of constellation points with the $i^{th}$ bit equal to one.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6 is a flow diagram illustrating a preferred method according to an embodiment herein.

DETAILED DESCRIPTION OF PREFERRED EMBODIMENTS

Figure 1:
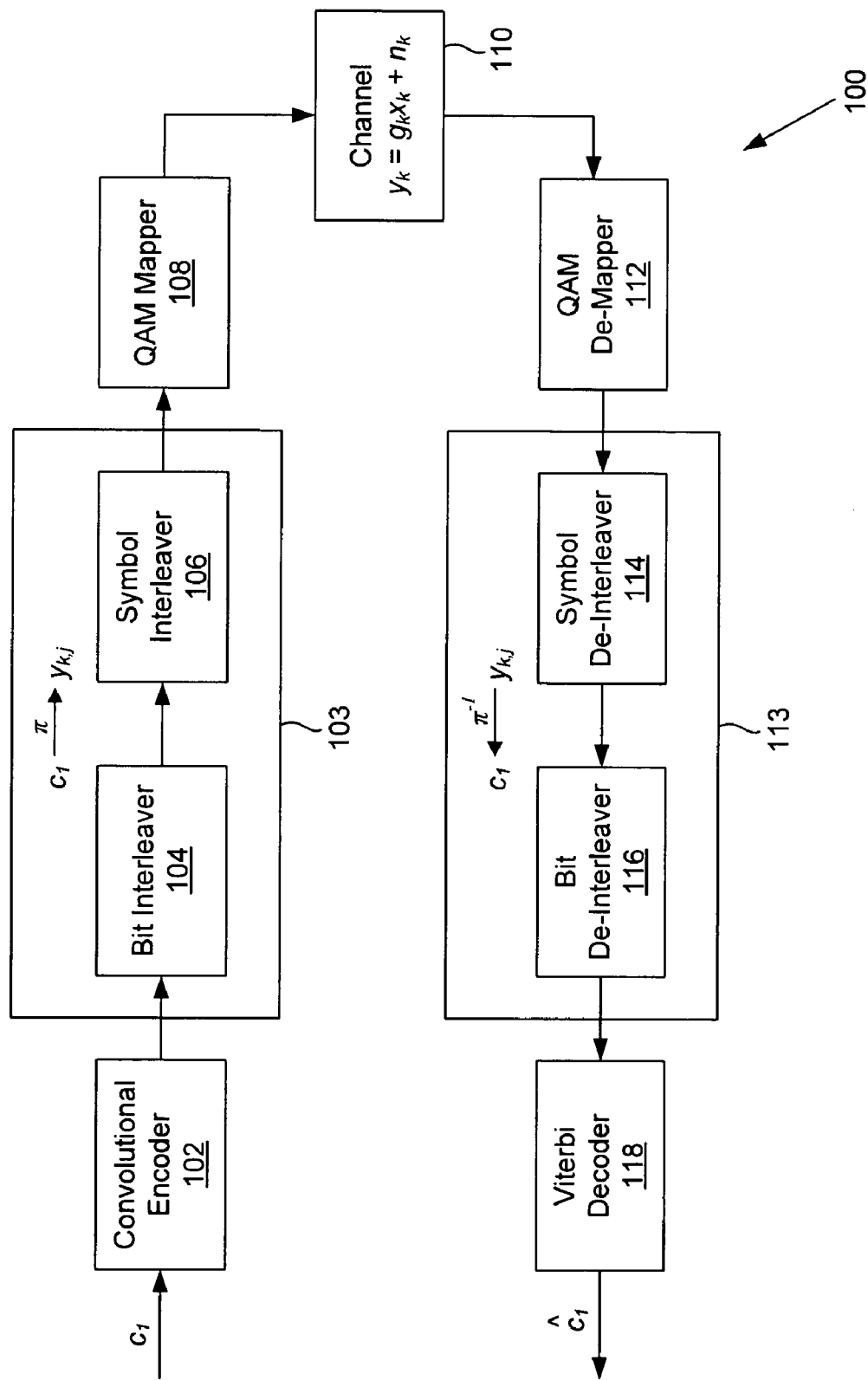
FIG. 1 illustrates a schematic diagram of a DVB-H system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new technique capable of providing a better channel transmission for digital handheld TV systems. The embodiments herein achieve this by providing a low complexity soft-input Viterbi decoding technique for digital communication systems. Referring now to the drawings, and more particularly to FIGS. 1 through 6, where similar reference characters denote corresponding features consistently throughout the figures, there are shown preferred embodiments.

In digital audio/video broadcast for handheld systems, bit-interleaved coded modulation (BICM) is used to increase the modulation diversity to improve performance in a fading channel. According to the embodiments herein, a low complexity soft-input Viterbi decoding methodology for decoding BICM is provided for digital audio/video broadcast systems. The embodiments herein may be implemented in digital baseband chip sets in a digital baseband receiver and supports international mobile TV standards including DVB-H/ISDB-T/DMB/Media-Flo™, etc. The application of the embodiments herein in DVB-H systems is described as an illustrative example and is not meant to limit the scope of the embodiments herein.

According to the embodiments herein, as shown in FIG. 1, in digital audio/video broadcasting over handheld device systems 100, bit-wise and symbol-wise interleaving 104, 106, respectively, are placed in between the convolution encoder 102 and the orthogonal-frequency-division-multiplexing (OFDM) QAM mapper 108 to increase the order of diversity over the Rayleigh fading channel 110. Accordingly, the embodiments herein include a low complexity soft-input Viterbi decoding methodology for the digital audio/video broadcasting receiver. The soft-input Viterbi decoding methodology takes advantage of the soft metric based on the probability of the received QAM symbols rather than the hard metric to improve the noise suppression capability in the Viterbi decoding scheme for the convolutional encoder. The methodology provided by the embodiments herein is based on the BICM decoder and achieves the desired performance with low-complexity for QPSK/16QAM/64QAM modulations. The low complexity is achieved through the approximation techniques in the derivation of the soft decision metric of the received QAM symbols.

In the block diagram of FIG. 1 illustrating the DVB-H bit-interleave coded modulation/demodulation system 100, $g_k$ is the channel state information; $x_k$ is the QAM symbol; $y_k$ is the received noisy QAM symbol; $c_l$ is the binary bit-stream; $n_k$ is the added white Gaussian noise (AWGN) with zero mean and a standard deviation of $\sigma$; and $\pi$ and $\pi^{-1}$ are the mapping and inverse mapping from the code domain with the binary bit-stream $c_l$ to the corresponding received symbol domain with symbol $y_{k,i}$, where $y_{k,i}$ denotes the $i^{th}$ bit of the $k^{th}$ received symbol.

According to the methodology provided by the embodiments herein, for each $c_l$ the Log-Likelihood Ratio (LLR) is defined as:

$$LLR(C_l(y_{k,i})) = \frac{\sigma^2}{2} \ln \frac{p(y_{k,i} \mid c_l = 1)}{p(y_{k,i} \mid c_l = 0)}.$$

$$= \frac{\sigma^2}{2} \ln \frac{\sum_{\alpha \in S_i^{(1)}} p(y_{k,i} \mid x_{k,i} = \alpha)}{\sum_{\alpha \in S_i^{(0)}} p(y_{k,i} \mid x_{k,i} = \alpha)}$$

where $S_i^{(b)}$ is the subset of all signals $x \in C^N$ of the QAM size ($2^m$) whose label has the value $b \in \{0,1\}$ in position i, i=1 ... m. Moreover, $$p(y_{k,i} | x_{k,i} = \alpha) = \frac{1}{\sqrt{2\pi}\,\sigma} e^{-\frac{|y_{k,i} - g_k \cdot \alpha|^2}{2\sigma^2}}, \quad (1)$$

and $$\ln \sum_j e^{z_j} \approx \max_j \ln e^{z_j} = \max_j z_j$$

Thus, $$\begin{aligned}
LLR(C_l(y_{k,i})) &= \frac{\sigma^2}{2} \cdot \frac{1}{2\sigma^2} \\
&\quad \left[ \max_{\alpha \in S_i^{(1)}} (-|y_{k,i} - g_k \cdot \alpha|^2) - \max_{\alpha \in S_i^{(0)}} (-|y_{k,i} - g_k \cdot \alpha|^2) \right] \\
&= \frac{1}{4} \left[ \min_{\varepsilon \in S_i^{(0)}} |y_{k,i} - g_k \cdot \alpha|^2 - \min_{\varepsilon \in S_i^{(1)}} |y_{k,i} - g_k \cdot \alpha|^2 \right] \\
&= \frac{|g_k|^2}{4} \left[ \min_{\alpha \in S_i^{(0)}} |z_{k,i} - \alpha|^2 - \min_{\alpha \in S_i^{(1)}} |z_{k,i} - \alpha|^2 \right],
\end{aligned}$$

where $z_{k,i} = \frac{y_{k,i}}{g_k}$.

Furthermore let $$m_b(c_l) = |g_k|^2 \min_{\alpha \in S_i^{(b)}} |z_{k,i} - \alpha|^2,$$

then:

$$LLR(c_l) = \frac{1}{4}(m_0(c_l) - m_1(c_l))$$

Equation (1) indicates that the LLR of the transmitted code $c_l$ can be computed by the difference of two metrics namely, $m_0$ and $m_1$, where $m_0$ is the minimum Euclidean distance from the received soft decision symbol to the hard decision symbols in the subset of constellation points with the $i^{th}$ bit equal to zero, and $m_1$ is the minimum Euclidean distance from the received soft decision symbol to the hard decision symbols in the subset of constellation points with the $i^{th}$ bit equal to one.

Given a received noisy QAM symbol $y_k$ (shown in block 110 in FIG. 1), for each corresponding demapped output bit i, i=1 ... m (shown in block 112 in FIG. 1), compute a soft bit metric LLR($c_l$) according to Equation (1). The computed soft bit metric LLR($c_l$) is then fed into the symbol de-interleaver 114 and bit de-interleaver 116. Finally, the de-interleaved bit stream is decoded using a standard soft input Viterbi decoder 118 thereby producing a decoded bit stream $\hat{c}_1$.

With respect to FIG. 1, let $c_l$ be the bit-stream going through the convolutional encoder 102, whereby the convolutional encoder 102 has a master encoder of rate ½ and uses puncture coding to achieve other code rates like ⅔, ¾, ⅚, and ⅞. The convolutional encoder 102 adds redundancy to the input bit streams $c_l$ and the output data streams are correlated among bits so that when some portion of the bit streams are corrupted by the channel noise the original input bit streams can still be recovered through the correlated adjacent bits. The corresponding decoder for the convolutional encoder 102 is the Viterbi decoder 118. The Viterbi decoder 118 is embodied as an efficient decoding algorithm based on a trellis search which implements the optimum Maximum Likelihood Sequence Estimation (MLSE) algorithm.

The corresponding hardware implementations of the encoder 102 and decoder 118 are preferably included in Forward Error Control (FEC) coding modules. The bit-stream after the convolutional encoder 102 is then feed into an interleaver block 103 which includes two parts: the first part is a bit-interleaver 104 and the second part is a symbol interleaver 106. The bit interleaver 104 re-orders the input bit-streams $c_l$ according to some interleaving algorithm and the output bit-stream is converted into word-stream according to the QAM symbol size and then proceeds through another re-ordering procedure for the symbol interleaver 106. On the receiver side 113, the reverse process is conducted which is denoted in modules 114 and 116.

The reason for the interleaving is to increase the order of diversity over a Rayleigh fading channel to improve the receiver performance for mobile reception. The symbol interleaved word-stream after symbol interleaver 106 is then mapped to the constellation point through the QAM mapper 108. On the receiver side 113 the received symbol $y_k$ with channel corruption is then fed into the QAM demapper 112 to generate the corresponding word-stream for the input to the symbol de-interleaver 114. Two QAM demapping algorithms can be used here.

The most straightforward and simple demapping algorithm is the hard decision demapping algorithm which slices the soft symbol input to demapper 112 and de-maps the constellation symbol. However, the performance of this algorithm may be poor and the benefits of using the interleaver 103 between the encoder 102 and the QAM mapper 108 may not be able to be fully explored.

The other QAM demapping algorithm is the soft decision decoding algorithm where each soft decision symbol input is demapped to a soft metric usually represented by a floating point number (or a quantized number in the fixed point implementation) according to the Euclidean distance between the received soft symbol and the closest constellation point, and then fed into the Viterbi decoder 118. However, due to the existence of the symbol de-interleaver 114 and bit de-interleaver 116 a soft decision metric for each bit of a symbol word should be generated; i.e., for each QPSK symbol, two soft decision metrics are needed; 16QAM, four soft decision metrics, and 64QAM, six soft decision metrics.

The soft decision metric for each bit is defined as the LLR in the context of the embodiments herein. The equations used to compute the soft decision metric for some bits in 16QAM and 64QAM can be complicated and not suitable for hardware implementation. However, in the context of the embodiments herein, a low complexity version of the soft decision metric algorithm is provided based on approximation techniques and the preferred algorithm can be implemented in the DVB-H/ISDB-T/T-DMB/Media-Flo™ baseband receiver chips. With respect to the soft-decision metric derivation, let LLR($y_{k,i}$) be the Log-Likelihood-Ratio soft decision metric of the $k^{th}$ symbol of the received noisy QAM symbol $y_k$; Equation (1) can be rewritten to Equation (2):

$$LLR(y_{k,i}) = \frac{1}{4}(m_0(y_{k,i}) - m_1(y_{k,i})) \quad (2)$$

Equation (2) states that the soft-decision metric LLR($y_{k,i}$) for the $i^{th}$ bit in the $k^{th}$ symbol $y_k$ can be computed by the difference of two metrics namely, $m_0$ and $m_1$, where $m_0$ is the minimum Euclidean distance from the received soft decision symbol to the hard decision symbols in the subset of constellation points with the $i^{th}$ bit equal to zero, and $m_1$ is the minimum Euclidean distance from the received soft decision symbol to the hard decision symbols in the subset of constellation points with the $i^{th}$ bit equal to one. The use of the soft decision metric as provided by the embodiments herein instead of the hard decision metric (as in conventional techniques) improves the overall system performance under an AWGN channel by several decibels (dBs).

Figure 2:
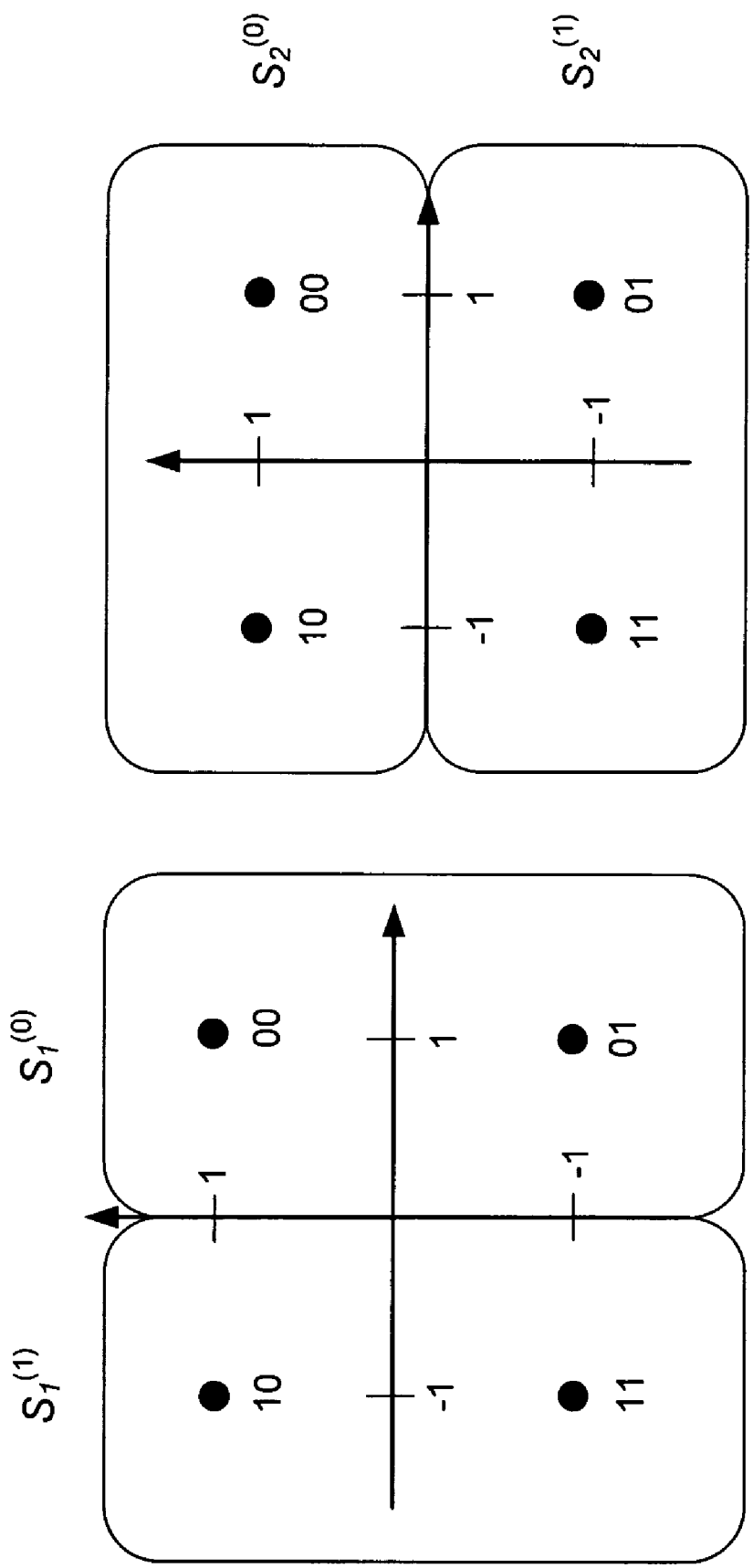
FIG. 2 illustrates a constellation diagram of a QPSK modulation scheme according to an embodiment herein.
Figure 3:
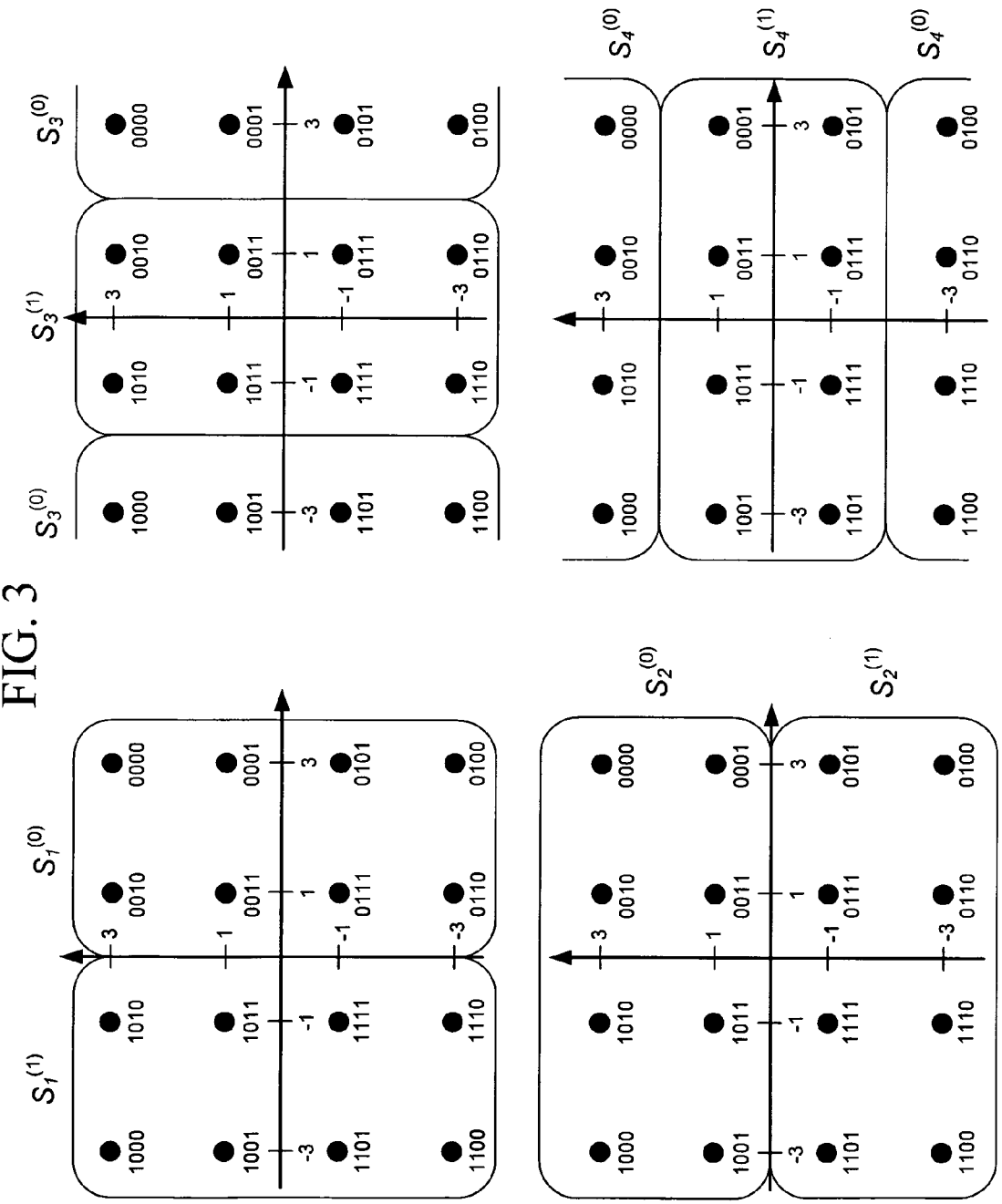
FIG. 3 illustrates a constellation diagram of a 16QAM modulation scheme according to an embodiment herein.
Figure 4:
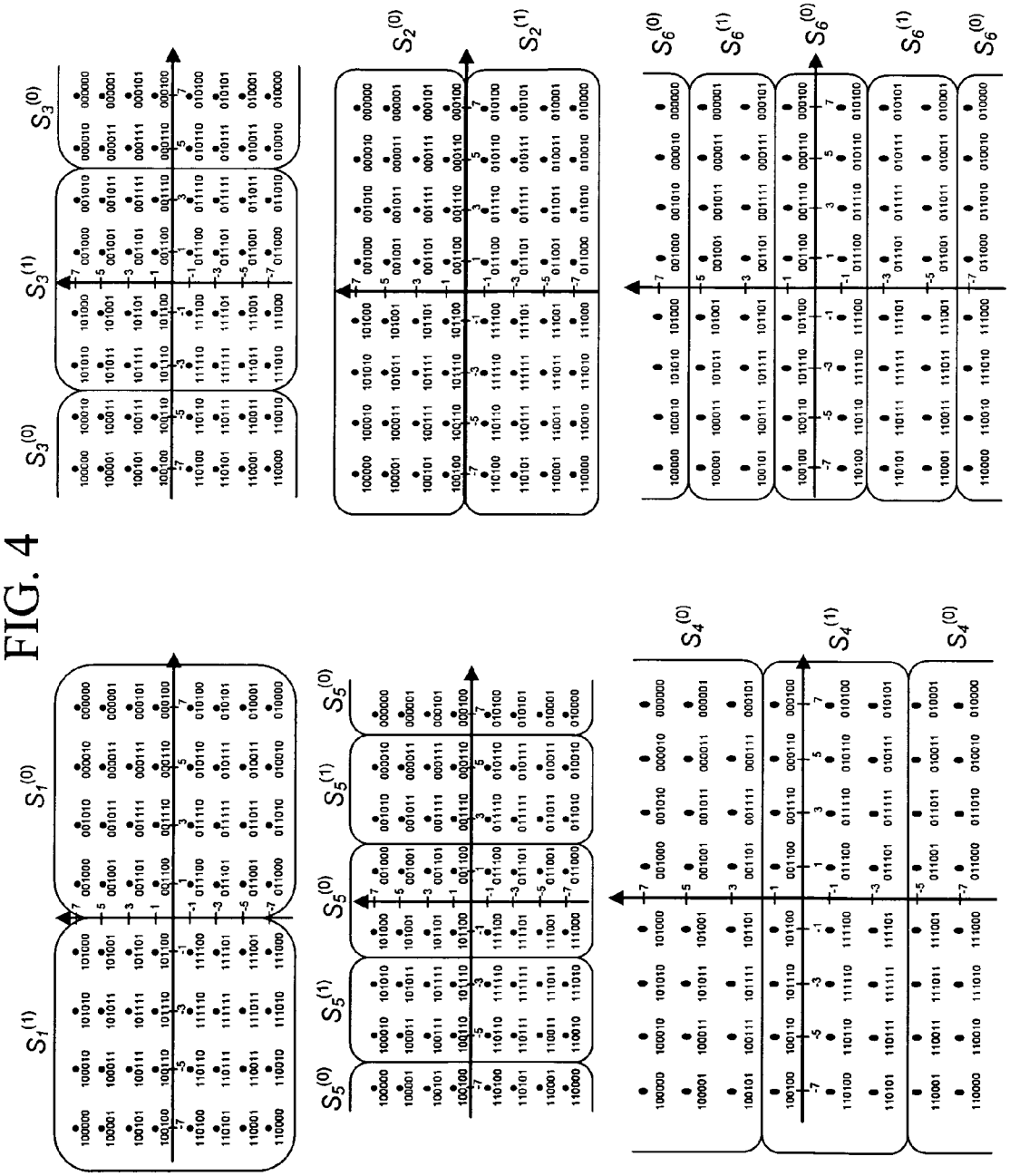
FIG. 4 illustrates a constellation diagram of a 64QAM modulation scheme according to an embodiment herein.

The soft decision metric for different QAM modulations can be calculated to be, for the QPSK constellation diagram shown in FIG. 2:

$$LLR(y_{k,1}) = LLR(y_{k_I,1}) = -g^2 \cdot y_I$$

$$LLR(y_{k,2}) = LLR(y_{k_Q,2}) = -g^2 \cdot y_Q$$

for the 16QAM constellation diagram shown in FIG. 3:

$$LLR(y_{k,1}) = LLR(y_{k_I,1}) = -g^2 \cdot \left( \begin{cases} y_I, & |y_I| < 2 \\ 2 \cdot (y_I - 1), & y_I > 2 \\ 2 \cdot (y_I + 1), & y_I < -2 \end{cases} \right) \approx -g^2 y_I$$

$$LLR(y_{k,2}) = LLR(y_{k_Q,2}) \approx -g^2 y_Q$$

$$LLR(y_{k,3}) = LLR(y_{k_I,3}) = g^2(-|y_I| + 2)$$

$$LLR(y_{k,4}) = LLR(y_{k_Q,4}) = g^2(-|y_Q| + 2)$$

and for the 64QAM constellation diagram shown in FIG. 4:

$$LLR(y_{k,1}) = LLR(y_{k_I,1}) = -g^2 \cdot \left( \begin{cases} -y_I, & |y_I| < 2 \\ -2(y_I - 1), & 2 < y_I < 4 \\ -3(y_I - 2), & 4 < y_I < 6 \\ -4(y_I - 3), & y_I > 6 \\ -2(y_I + 1), & -4 < y_I < -2 \\ -3(y_I + 2), & -6 < y_I < -4 \\ -4(y_I + 3), & y_I < -6 \end{cases} \right) \approx -g^2 y_I$$

$$LLR(y_{k,2}) = LLR(y_{k_Q,2}) \approx -g^2 y_Q$$

$$LLR(y_{k,3}) = LLR(y_{k_I,3}) = g^2(-|y_I| + 4)$$

$$LLR(y_{k,4}) = LLR(y_{k_Q,4}) = g^2(-|y_Q| + 4)$$

$$LLR(y_{k,5}) = LLR(y_{k_Q,5}) = g^2(-||y_I| - 4| + 2)$$

$$LLR(y_{k,6}) = LLR(y_{k_Q,6}) = g^2(-||y_Q| - 4| + 2)$$

It is noteworthy that the exact formula for the soft decision metric calculation for the first and second bits; i.e., $LLR(y_{k,1})$ and $LLR(y_{k,2})$ for both 16QAM and 64QAM are quite complicated and not suitable for hardware implementation. Approximations are used to simplify the final results which are shown in the formulas above. It can be shown that the performance degradation due to above approximation is insignificant in practical application, which makes the above formula attractive in hardware implementation. Given a received soft decision symbol $y_k$ for any QAM modulation size, namely QPSK/16QAM/64QAM, the above results allow the equations to calculate the corresponding soft decision metric for each bit in the corresponding demapped word. Each soft word for example, consists of two soft decision metrics corresponding to the 2 bits in QPSK modulation. Each soft decision metric can be represented, for example, by 5 bits in the fixed point implementation. These soft words are then fed into the symbol de-interleaver 114 and bit de-interleaver 116 and eventually to the Viterbi decoder 118 for proper decoding.

A MATLAB® (available from The MathWorks, Inc., Massachusetts, USA) implementation of the embodiments herein is provided below:

```
function m = qam__demap__soft(x,QAM,G)
% x: soft complex input constellation point
% G: channel state information
% WL__mbit: m is integer in the range of [0 2^N]
% y: words of bit metrics of soft input data
% Mapping: -1 --> 0, and +1 --> 1.
y = x;
d = zeros(log2(QAM),length(y));
yi = real(y);
yq = imag(y);
switch (QAM)
    case 4,
        d(1,:) = -yi;
        d(2,:) = -yq;
    case 16,
        d(1,:) = -yi;
        d(2,:) = -yq;
        d(3,:) = -abs(yi)+2;
        d(4,:) = -abs(yq)+2;
    case 64,
        d(1,:) = -yi;
        d(2,:) = -yq;
        d(3,:) = -abs(yi)+4;
        d(4,:) = -abs(yq)+4;
        d(5,:) = -abs(abs(yi)-4)+2;
        d(6,:) = -abs(abs(yq)-4)+2;
end
d = d.'; % change to Nxv format
[rsize, csize] = size(d);
m = ((abs(G).^2) * ones(1,csize)) .* d;
```

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form including both hardware and software elements. The software embodiments include, but is not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
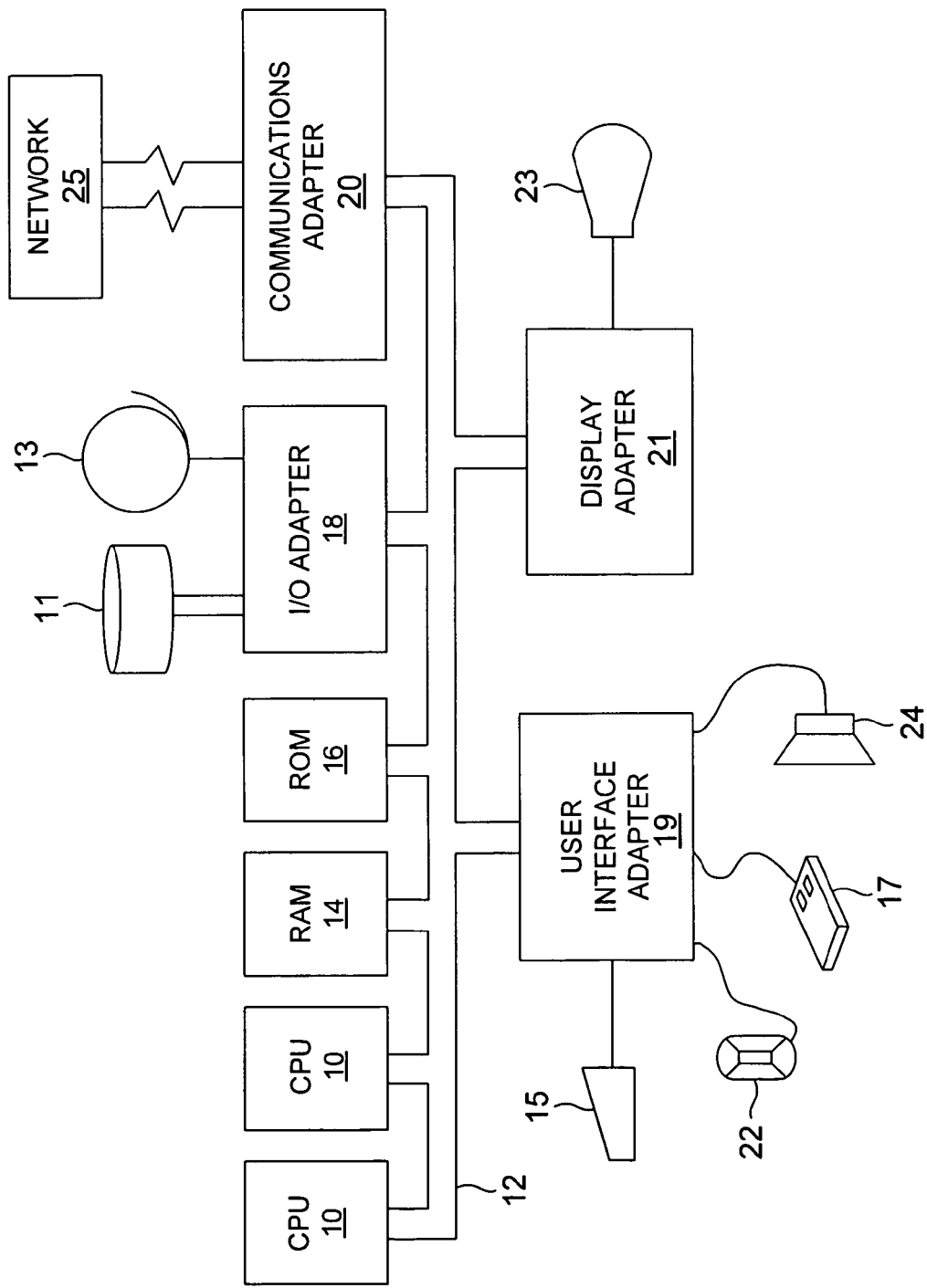
FIG. 5 illustrates a computer system diagram according to an embodiment herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a RAM 14, ROM 16, and an I/O adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

FIG. 6, with reference to FIGS. 1 through 5, is a flow diagram illustrating a DVB-H bit-interleave coded modulation/demodulation method according to an embodiment herein, wherein the method comprises transmitting (201) a data stream $c_l$; rearranging (203) a sequence of the transmitted data stream $c_l$ into a digital bit sequence using bit-wise and symbol-wise interleaving; mapping (205) the digital bit sequence according to a predetermined modulation scheme; introducing (207) a channel factor to a modulated digital bit sequence; demapping (209) the modulated digital bit sequence; de-interleaving (211) the demapped digital bit sequence using bit-wise and symbol-wise de-interleaving; and decoding (213) the de-interleaved digital bit sequence using a Viterbi decoder 118.

Preferably, the method further comprises decoding a soft decision metric for any of a QPSK, 16QAM, and 64QAM modulation. Moreover, the method may further comprise decoding a soft decision metric computation comprising a LLR soft decision metric of a binary bit stream of a signal. The LLR corresponding to the binary bit stream of a signal may equal $$\frac{1}{4}(m_0(c_l) - m_1(c_l)),$$

wherein $c_l$ represents transmitted code of the binary bit stream, wherein $m_0$ represents a minimum Euclidean distance from a received soft decision symbol to hard decision symbols in a subset of constellation points with an $i^{th}$ bit equal to zero, and wherein $m_1$ represents a minimum Euclidean distance from the received soft decision symbol to the hard decision symbols in the subset of constellation points with the $i^{th}$ bit equal to one.

Additionally, the soft decision metric of a $k^{th}$ symbol of a received noisy QAM symbol, $y_k$, the LLR corresponding to an $i^{th}$ bit in a $k^{th}$ symbol of a received noisy QAM symbol, $y_k$, may equal $$\frac{1}{4}(m_0(y_{k,i}) - m_1(y_{k,i})),$$

wherein $m_0$ represents a minimum Euclidean distance from a received soft decision symbol to hard decision symbols in a subset of constellation points with an $i^{th}$ bit equal to zero, and wherein $m_1$ represents a minimum Euclidean distance from the received soft decision symbol to the hard decision symbols in the subset of constellation points with the $i^{th}$ bit equal to one.

Generally, the soft decision metric computation in the QAM demapper 112 for BICM decoding uses the LLR and its formula is provided in Equations (1) and (2). The approximations are used in the derivations of the soft decision metric (LLR), specifically for the first and second bits in both 16QAM and 64QAM modulation for DVB-H systems. The performance degradation due to the approximation is insignificant in the practical DVB-H receiver chip design. The results significantly reduce the computation complexity of the algorithm and are very attractive for hardware implementation. Furthermore, the application of the above BICM decoding scheme may be implemented to the DVB-H baseband receiver design and to the ISDB-T/T-DMB/Media-Flo™ baseband receiver designs. Moreover, the techniques provided herein may be used with any QAM modulation. In the examples provided herein, DVB-H based QAM modulation is applied, and thus equations derived herein for the soft decision metrics are specifically for the DVB-H system. For ISDB-T/T-DMB/Media-Flo™ systems, the equations might be slightly different due to a different QAM constellation mapping scheme.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A communication system comprising:
   a convolutional encoder;
   an interleaver operatively connected to said convolutional encoder;
   a quadrature amplitude modulation (QAM) mapper operatively connected to said interleaver;
   a channel component operatively connected to said QAM mapper;
   a QAM demapper operatively connected to said channel component;
   a de-interleaver operatively connected to said QAM demapper, wherein said de-interleaver is adapted to decode a soft decision metric computation comprising a log-likelihood ratio (LLR) soft decision metric of a binary bit stream of a signal, and wherein said LLR corresponding to said binary bit stream of a signal equals $$\frac{1}{4}(m_0(c_l) - m_1(c_l)),$$

wherein $c_l$ represents transmitted code of said binary bit stream, wherein $m_0$ represents a minimum Euclidean distance from a received soft decision symbol to hard decision symbols in a subset of constellation points with an $i^{th}$ bit equal to zero, and wherein $m_1$ represents a minimum Euclidean distance from said received soft decision symbol to said hard decision symbols in said subset of constellation points with said $i^{th}$ bit equal to one; and
   a Viterbi decoder operatively connected to said de-interleaver.

2. The system of claim 1, wherein said interleaver comprises:
   a bit-wise interleaver; and
   a symbol-wise interleaver operatively connected to said bit-wise interleaver.

3. The system of claim 1, wherein said de-interleaver comprises:
   a bit-wise de-interleaver; and
   a symbol-wise de-interleaver operatively connected to said bit-wise de-interleaver.

4. The system of claim 1, wherein said de-interleaver is adapted to decode a soft decision metric for any of a quadrature phase-shift (QPSK), 16QAM, and 64QAM modulation.

5. The system of claim 1, wherein said convolutional encoder adds redundancy to said binary bit stream of a signal.

6. The system of claim 1, wherein said Viterbi decoder is adapted to decode a de-interleaved binary bit stream transmitted from said de-interleaver.

7. The system of claim 1, wherein each of said convolutional encoder and said Viterbi decoder comprise Forward Error Control (FEC) coding modules.

8. A method comprising:
   providing a data stream;
   rearranging a sequence of the data stream into a digital bit sequence using bit-wise and symbol-wise interleaving;
   mapping said digital bit sequence according to a predetermined modulation scheme;
   introducing a channel factor to a modulated digital bit sequence;
   demapping said modulated digital bit sequence;
   de-interleaving the demapped digital bit sequence using bit-wise and symbol-wise de-interleaving;
   decoding a soft decision metric computation comprising a log-likelihood ratio (LLR) soft decision metric of a binary bit stream of a signal, wherein said LLR corresponding to said binary bit stream of a signal equals $$\frac{1}{4}(m_0(c_l) - m_1(c_l)),$$

wherein $c_l$ represents transmitted code of said binary bit stream, wherein $m_0$ represents a minimum Euclidean distance from a received soft decision symbol to hard decision symbols in a subset of constellation points with an $i^{th}$ bit equal to zero, and wherein $m_1$ represents a minimum Euclidean distance from said received soft decision symbol to said hard decision symbols in said subset of constellation points with said $i^{th}$ bit equal to one; and
   decoding the de-interleaved digital bit sequence using a Viterbi decoder.

9. The method of claim 8, further comprising decoding a soft decision metric for any of a quadrature phase-shift (QPSK), 16QAM, and 64QAM modulation.

10. The method of claim 8, further comprising adding redundancy to said data stream.

11. The method of claim 8, further comprising executing said method using a computer.

12. A communication system comprising:
    a convolutional encoder;
    an interleaver operatively connected to said convolutional encoder;
    a quadrature amplitude modulation (QAM) mapper operatively connected to said interleaver;
    a channel component operatively connected to said QAM mapper;
    a QAM demapper operatively connected to said channel component;
    a de-interleaver operatively connected to said QAM demapper, wherein said de-interleaver is adapted to decode a soft decision metric computation comprising a log-likelihood ratio (LLR) soft decision metric of a binary bit stream of a signal, and wherein said soft decision metric of a $k^{th}$ symbol of a received noisy QAM symbol, $y_k$, said LLR corresponding to an $i^{th}$ bit in a $k^{th}$ symbol of a received noisy QAM symbol, $y_k$, equals $$\frac{1}{4}(m_0(y_{k,i}) - m_1(y_{k,i})),$$

wherein $m_0$ represents a minimum Euclidean distance from a received soft decision symbol to hard decision symbols in a subset of constellation points with an $i^{th}$ bit equal to zero, and wherein $m_1$ represents a minimum Euclidean distance from said received soft decision symbol to said hard decision symbols in said subset of constellation points with said $i^{th}$ bit equal to one; and a Viterbi decoder operatively connected to said de-interleaver.

13. The system of claim 12, wherein said interleaver comprises:

a bit-wise interleaver; and a symbol-wise interleaver operatively connected to said bit-wise interleaver.

14. The system of claim 12, wherein said de-interleaver comprises:

a bit-wise de-interleaver; and a symbol-wise de-interleaver operatively connected to said bit-wise de-interleaver.

15. The system of claim 12, wherein said de-interleaver is adapted to decode a soft decision metric for any of a quadrature phase-shift (QPSK), 16QAM, and 64QAM modulation.

16. The system of claim 12, wherein said convolutional encoder adds redundancy to said binary bit stream of a signal.

17. The system of claim 12, wherein said Viterbi decoder is adapted to decode a de-interleaved binary bit stream transmitted from said de-interleaver.

\* \* \* \* \*